United States Patent [19]
Ishikawa

[11] Patent Number: 5,489,990
[45] Date of Patent: Feb. 6, 1996

[54] IMAGE PROCESSING WITH SMOOTH INTERPOLATION

[75] Inventor: Yuji Ishikawa, Yokohama, Japan

[73] Assignee: Canon Kabushiki Kaisha, Tokyo, Japan

[21] Appl. No.: 322,378

[22] Filed: Oct. 13, 1994

Related U.S. Application Data

[63] Continuation of Ser. No. 27,631, Mar. 8, 1993, abandoned.

[30] Foreign Application Priority Data

Mar. 13, 1992 [JP] Japan .................................. 4-054882

[51] Int. Cl.$^6$ ................................................. H04N 1/393
[52] U.S. Cl. .................................. 358/451; 358/448
[58] Field of Search .................................. 358/448, 451, 358/443, 445; 348/445–448, 456, 458

[56] References Cited

U.S. PATENT DOCUMENTS

| | | | |
|---|---|---|---|
| 3,976,982 | 8/1976 | Eiselen | 358/451 |
| 4,394,693 | 7/1983 | Shirley | 358/451 |
| 4,605,957 | 7/1986 | Yamada | 358/451 |
| 4,631,751 | 12/1986 | Anderson et al. | 358/451 |
| 4,827,353 | 5/1989 | Ehlers et al. | 358/451 |
| 5,097,518 | 3/1992 | Scott et al. | 358/451 |
| 5,099,327 | 3/1992 | Murakoshi | 348/458 |
| 5,237,432 | 8/1993 | Calarco et al. | 358/451 |

*Primary Examiner*—Stephen Brinich
*Attorney, Agent, or Firm*—Fitzpatrick, Cella, Harper & Scinto

[57] ABSTRACT

An image forming apparatus forms interpolating image data of a plurality of lines subjected to smoothing processing including original image data from the original image data. The apparatus selects and outputs image data of a predetermined number of lines corresponding to a reduction ratio from among the image data of the plurality of lines. A reduced image subjected to smoothing processing with high picture quality without loss of information of original lines is thereby obtained.

17 Claims, 13 Drawing Sheets

(ORIGINAL)     (REDUCED BY 4/5)

WHEN ORIGINAL LINE IS SKIPPED

IMAGE PROCESSING WITH SMOOTH INTERPOLATION

This application is a continuation, of application Ser. No. 08/027,631, filed Mar. 8, 1993, now abandoned.

BACKGROUND OF THE INVENTION

1. Field of the Invention

This invention relates to an image forming apparatus which can reduce the size of an input image, and more particularly, to an image forming apparatus suitable for image communication, such as a facsimile apparatus or the like.

2. Description of the Related Art

In conventional image communication apparatus, such as facsimile apparatus or the like, a received image becomes in some cases an image that is longer than a standard format because a header or the like is added, and therefore cannot be recorded on standard format recording paper. In order to overcome such a problem, a received image is recorded by reducing received data in the sub-scanning direction. In this case, a method of reducing the size of an image by skipping received image data for one line at a constant interval (i.e., skipping the data of every nth line for some natural number n) has been widely adopted.

In current image communication apparatuses, the transmission side selects one line density from among a plurality of line densities in the sub-scanning direction, reads an image with the selected line density, and transmits the read data. The reception side performs image formation based on received data using recording means, such as a thermal print head or the like.

Standard (3.85 lines/mm), fine (7.7 lines/mm) and superfine (15.4 lines/mm) line densities in the sub-scanning direction are provided. Recording means at the reception side can record with the superfine (15.4 lines/mm) line density in the sub-scanning direction. When received data have the standard (3.85 lines/mm) line density, an apparatus at the reception side moves recording paper with a pitch of $1/15.4$ mm and records received data for one line repeatedly four times at every movement. When received data have the fine (7.7 lines/mm) line density, the apparatus moves recording paper with a pitch of $1/15.4$ mm and records received data for one line repeatedly twice at every movement.

As described above, when reducing the size of a received image in the sub-scanning direction, received data for one line are skipped at a constant interval (for example, in the case of size reduction to 90%, received data for one line are skipped for every 10 lines). Hence, data of intervals of $1/3.85$ mm and $1/7.7$ mm are lost when received data have the standard line density and the fine line density, respectively, causing deterioration in the recorded image.

A method of smoothly realizing a step in an image by smoothing processing for received image data has been known. In this method, smoothing correction is performed after skipping received original lines when reducing the size of a received image. As a result, information on skipped lines cannot be utilized in smoothing correction processing, causing deterioration in image quality.

SUMMARY OF THE INVENTION

It is an object of the present invention to overcome the above-described problems in the prior art.

It is a further object of the present invention to provide an image forming apparatus which can produce a reduced image with high picture quality subjected to smoothing processing without losing information on original lines.

It is a still further object of the present invention to provide an image forming apparatus which can produce a reduced image with high picture quality by forming interpolated image data subjected to smoothing processing which includes forming a plurality of lines including original image data from the original image data, subsequently selecting image data including a predetermined number of lines in accordance with the reduction ratio from the image data of the plurality of lines, and outputting the selected image data.

It is still another object of the present invention to provide an image forming apparatus which can obtain a reduced image subjected to smoothing processing with little deterioration in picture quality with a simple configuration.

The foregoing and other objects, advantages and features of the present invention will become more apparent from the following detailed description of the preferred embodidments taken in conjuction with the accompanying drawings.

DETAILED DESCRIPTION OF THE PREFERRED EMBODIMENTS

Preferred embodiments of the present invention will now be described in detail with reference to the accompanying drawings.

FIRST EMBODIMENT

A first embodiment of the present invention will be described illustrating a facsimile apparatus having a communication function as an image output apparatus that prints an image reducing or magnifying the size of an original image.

Figure 1:
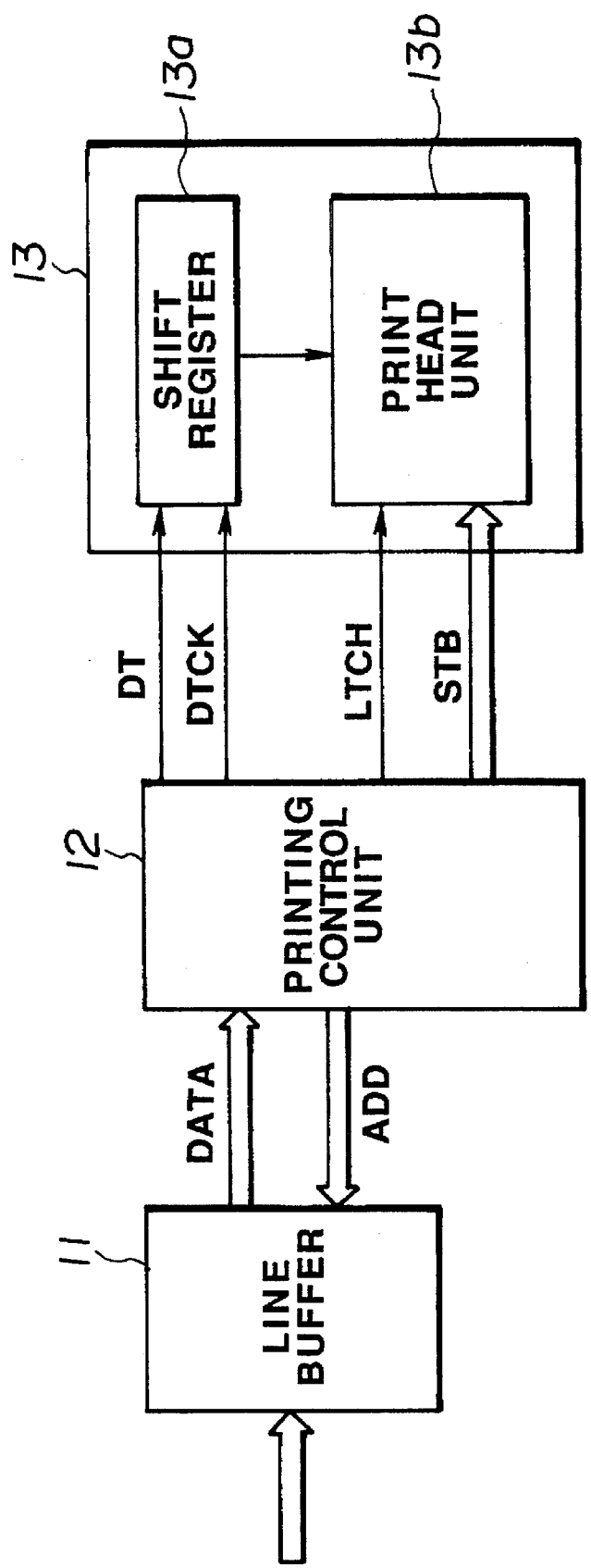
FIG. 1 is a block diagram showing a principal part of a facsimile apparatus according to a first embodiment of the present invention.

FIG. 1 is a block diagram showing the configuration of a principal part of the facsimile apparatus of the first embodiment. In FIG. 1, line buffer 11 temporarily stores lines of an original print image. Printing control unit 12 controls a printing operation by reading the data of the same line in print image data from line buffer 11 a predetermined number of times and outputting the read data to printing unit 13. Printing unit 13 receives the read data and performs a printing operation under the control of printing control unit 12. Data transmitted from other facsimile apparatuses are stored in line buffer 11.

Printing unit 13 includes shift register 13a which temporarily stores data for one line and shifts serial print data, and print head unit 13b which receives parallel print data for one line output from shift register 13a and prints the received data through a print head.

For example, if it is assumed that the density of image data in the sub-scanning direction within line buffer 11 is 3.85 lines/mm and the density in the sub-scanning direction provided by printing unit 13 is 15.4 lines/mm, the apparatus operates in the following way in the case of performing a printing operation with unit magnification.

First, printing control unit 12 sequentially reads image data for one line from line buffer 11 addressed by address signal ADD, performs parallel-serial conversion, and transfers the converted signal DT and data clock signal DTCK for signal DT to shift register 13a of printing unit 13.

When print data for one line are thus transferred to shift register 13a, print head unit 13b inputs parallel data for one line from shift register 13a to a latch under control of latch signal LTCH.

The latched data are printed on recording paper in accordance with strobe signal STB from printing control unit 12.

Thus, a portion corresponding to ¼ of the dot width of the original image is printed. Thereafter printing control unit 12 again reads the data of the just printed line from line buffer 11, and prints the read data in the same manner.

After repeating the printing of the same line four times, printer control unit 12 advances the line to be read from line buffer 11 by one line.

The printing operation in the case of unit magnification has now been described. In the present embodiment, reduction of the size of an image in the sub-scanning direction is performed by reducing the frequency of reading the same line from the line buffer 12 for every predetermined number of print lines. Reduction of a printed image in a facsimile apparatus becomes necessary when, for example, an image must be printed in a limited printing area, such as when images stored in a storage memory of an apparatus in the case of transmission with a memory must be printed (as a report of transmitted documents or a report of untransmitted documents), or when images received in a memory must be printed.

Figure 2:
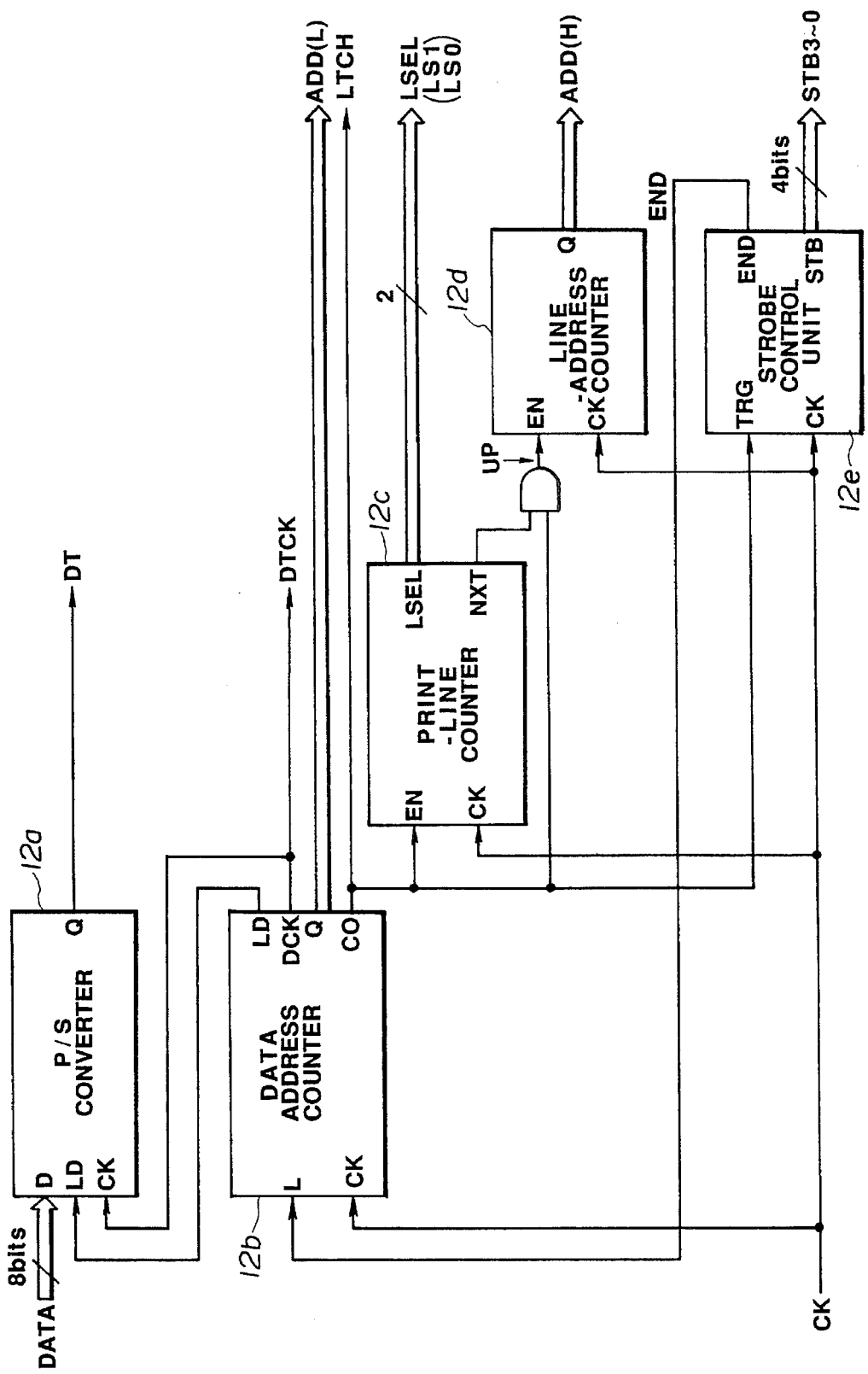
FIG. 2 is a diagram showing circuitry of the printing control unit 12 shown in FIG. 1.

FIG. 2 is a diagram showing circuitry of printing control unit 12 shown in FIG. 1. In FIG. 2, parallel-serial converter 12a converts 8-bit parallel print data into serial data. Address counter 12b generates data addresses $A_7$–$A_0$ to access line buffer 11, and controls data clock signals and latch signals. Print-line counter 12c counts the frequency of printing operations for the same line by counting latch signals LTCH, and increments the value of address counter 12d (to be described below) for counting line addresses in line buffer 11 by one when the frequency of printing operations reaches a predetermined number. The line address counter 12d assigns the line to be accessed to line buffer 11. Strobe control unit 12e outputs 4-bit strobe signals STB3–STB0 for driving the print head, and outputs end signal END when the output of strobe signals for one line has been completed.

Figures 3A, 3B:
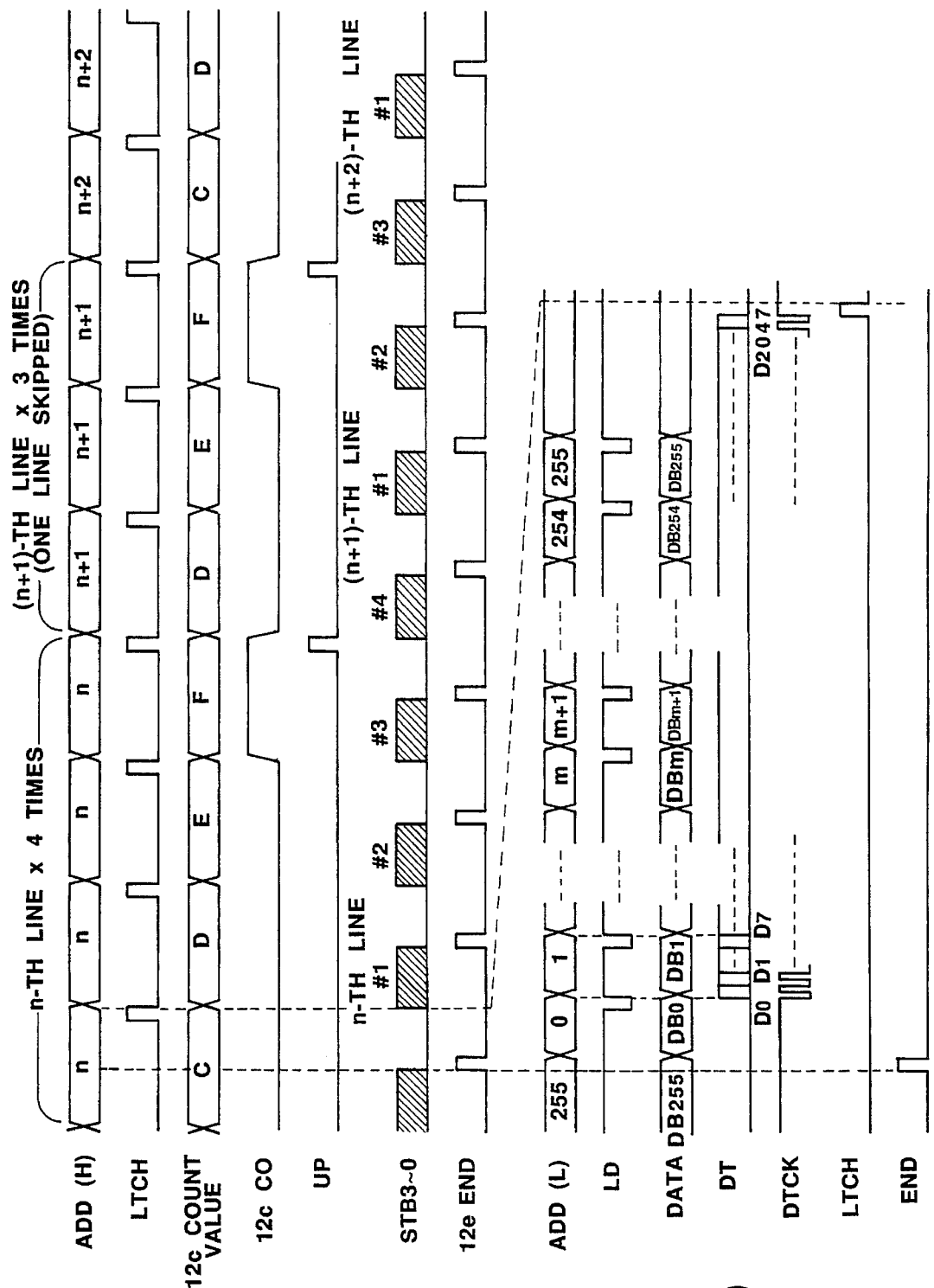
FIGS. 3(A) and 3(B) are timing charts for the circuitry shown in FIG. 2.

In the above-described configuration, print-line counter 12c reloads an initial value every time a carry signal has been output, and changes the initial value to be reloaded for every reloading operation when reducing the size of an original image. It is thereby possible to control between the case of not performing a skipping operation (#1 shown in FIG. 12) and the case of performing a skipping operation (#2–#5 shown in FIG. 12). For example, in the case of #1 shown in FIG. 12, the reloaded value is set to 4. In the case of #2, the reloaded value is set to 3. FIGS. 3(A) and 3(B) are timing charts for the circuitry shown in FIG. 2. FIG. 3(A) illustrates cases of writing one line of an original image (3.85 lines/mm) repeatedly four times and three times. When recording the n-th line, print-line counter 12c completes counting after inputting the data of the n-th line four times, and starts to input the data of the (n+1)th line. Print-line counter 12c completes counting after inputting the data of the (n+1)th line three times, and starts to input the data of the (n+2)th line.

FIG. 3(B) is an enlarged diagram of a part of FIG. 3(A), and indicates that data of one line has 2048 dots (256 bytes).

Figure 11:
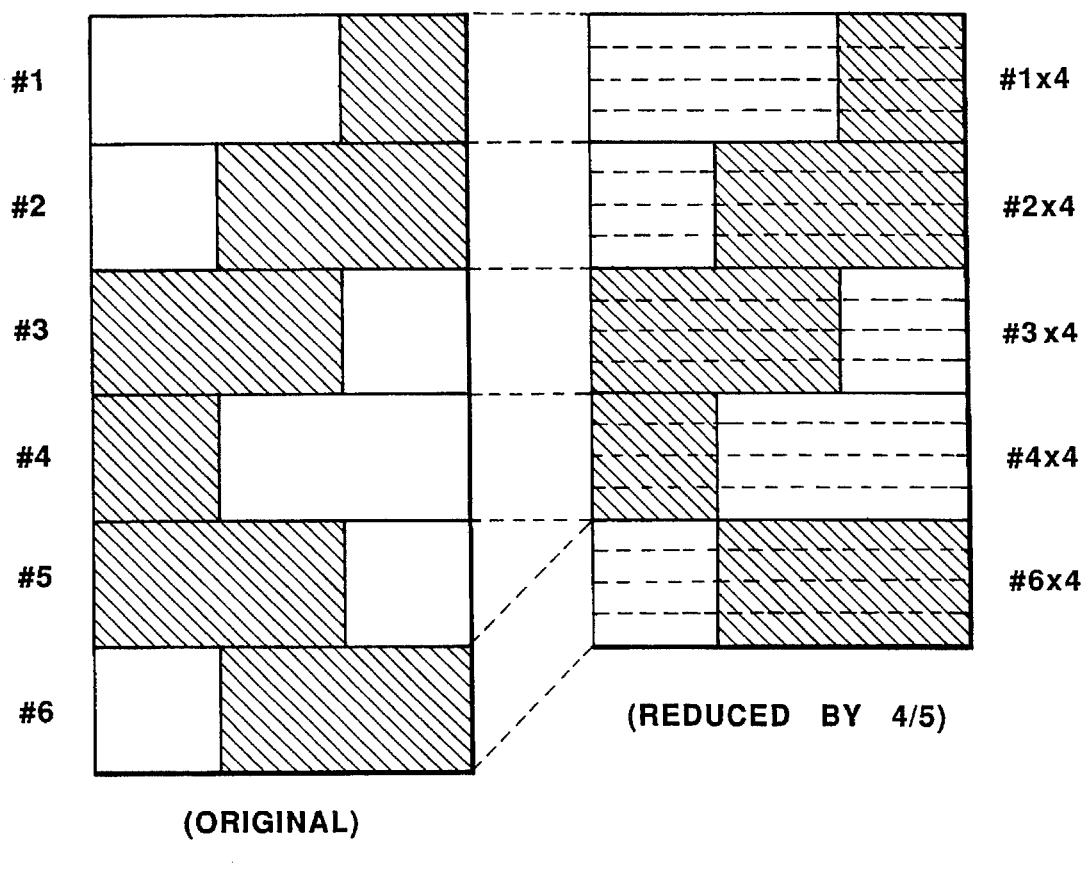
FIG. 11 is a diagram illustrating a printed image obtained by reducing the size of an original image in the sub-scanning direction by skipping lines.
Figure 12:
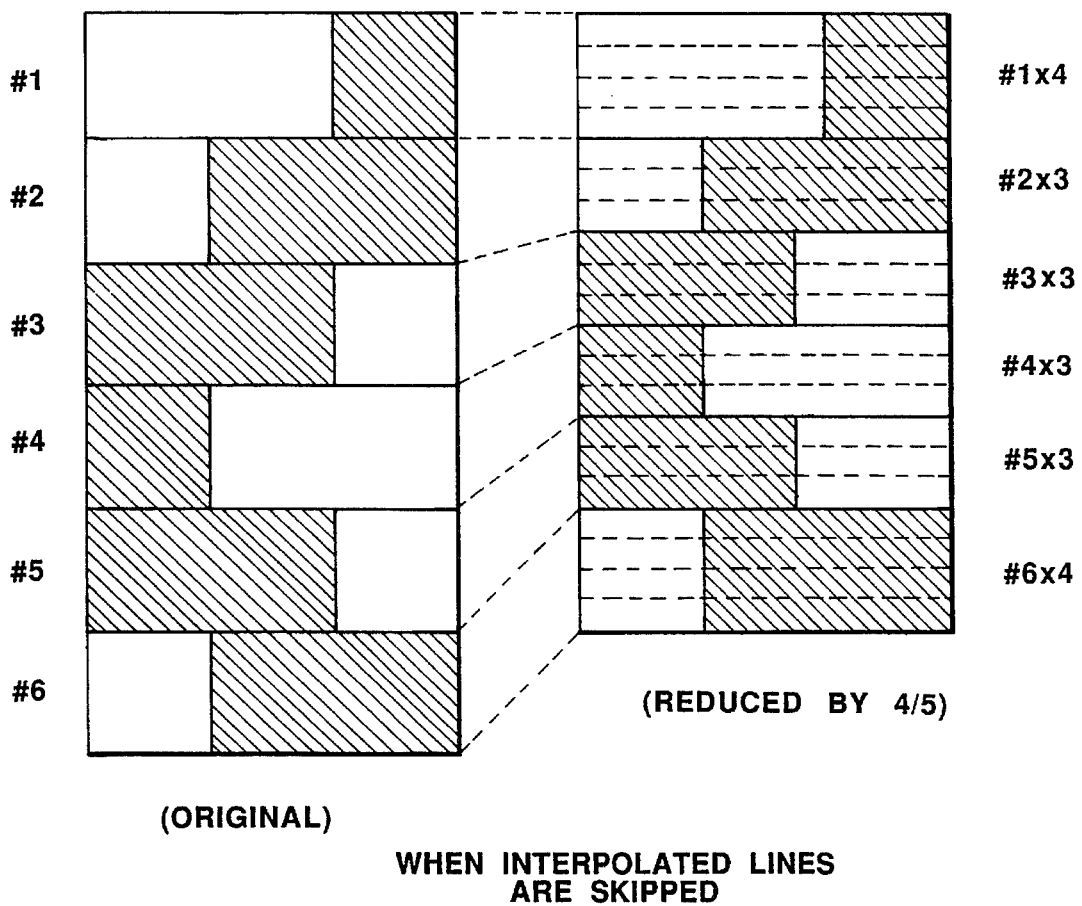
FIG. 12 is a diagram illustrating a printed image obtained by performing size reduction in the sub-scanning direction in the first embodiment.

FIG. 11 is a diagram illustrating a printed image obtained by reducing the size of an original image in the sub-scanning direction by skipping lines. FIG. 12 is a diagram illustrating a printed image obtained by performing the method of size reduction in the sub-scanning direction in the first embodiment.

In FIG. 11, if it is assumed that the image at the left is an original image with 3.85 lines/mm, the fifth line of the original image is completedly deleted when the size of the original image is reduced in the sub-scanning direction by ⅘.

To the contrary, in FIG. 12 representing the present embodiment, an original line is assumed to comprise four lines having a width of ¼ the original line width, and each of the second, third, fourth and fifth original lines is printed with reducing its width by ¼. Hence, the size reduction has little effect on the picture quality of the printed image.

As described above, according to the first embodiment, the size of an original image in the sub-scanning direction can be reduced without loosing any lines in the original image. In other words, deterioration in the picture quality of a reduced image is prevented.

SECOND EMBODIMENT

Figure 4:
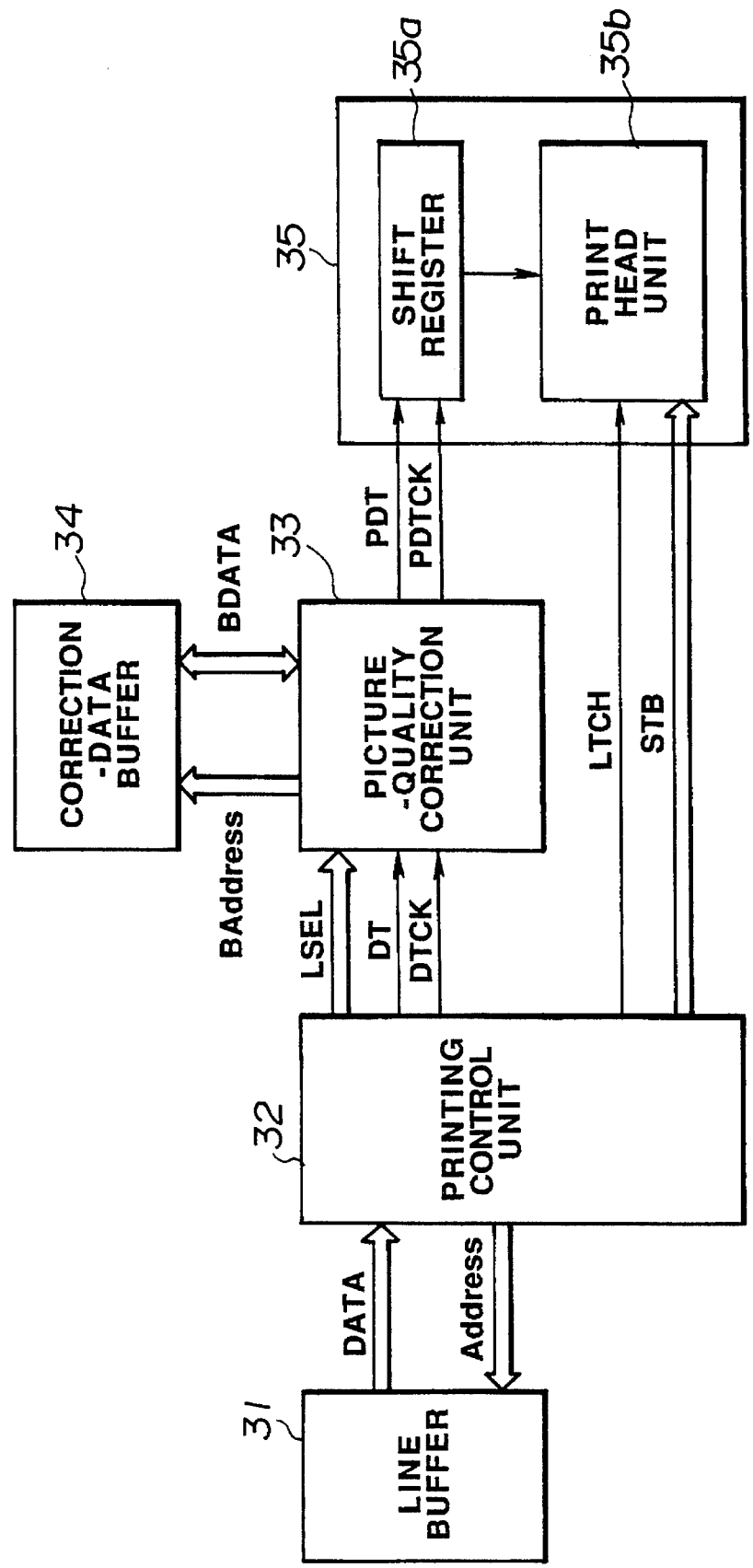
FIG. 4 is a block diagram showing a principal part of a facsimile apparatus according to a second embodiment of the present invenntion.

FIG. 4 is a block diagram showing a principal part of a facsimile apparatus according to a second embodiment of the present invention. In FIG. 4, line buffer 31 temporarily stores lines of an original print image. Printing control unit 32 controls a printing operation by reading data of one line in original print image data from line buffer 31 and outputting the read data to picture-quality correction unit 33. Picture-quality correction unit 33 receives the original print image data and first stores the data in correction-data buffer 34. Picture-quality correction unit 33 also forms data of interpolating lines while sequentially reading original print image data for a plurality of lines stored in the correction-data buffer 34, and outputs the formed data. The correction-data buffer 34 stores original print image data for a plurality of lines in the sub-scanning direction. Printing unit 35 receives print data, and performs a printing operation under the control of the printing control unit 32.

In printing unit 35, shift register 35a temporarily stores data for one line by shifting serial print data. Print head unit 35b receives parallel print data for one line output from shift register 13a, and prints the received data through a print head.

"DATA" indicates original print image data, "Address" indicates a read address to line buffer 31, and "LSEL" indicates a signal for selecting interpolating lines to be printed.

The operation of the apparatus will now be described illustrating the case of printing an image obtained by performing smoothing processing of an original image with 3.85 lines/mm with a resolution of 15.4 lines/mm.

For printing one line of the original image, printing control unit 32 first reads image data of that line from line buffer 31, performs parallel-serial conversion, and outputs the resultant data to picture-quality correction unit 33.

Picture-quality correction unit 33 stores data of one pixel (picture element) in correction-data buffer 34 every time it is input from printing control unit 32, and thereafter takes out data of pixels situated at the same position in the main-scanning direction in a plurality of lines which have been stored in correction-data buffer 34. Thus, picture-quality correction unit 33 forms a matrix comprising N pixels×M pixels of the original image surrounding a target pixel for which correction data are to be formed, and sequentially forms data of three interpolating lines for input data of one line based on the relationship among pixels surrounding the target pixel.

Printing control unit 32 selects input data stored in correction-data buffer 34 or the above-described data of three interpolating lines as data PDT of print lines which picture-quality correction unit 33 outputs to printing unit 35 in accordance with signal LSEL.

Since the printing operation for lines transferred to printing unit 35 is the same as the operation described with reference to FIG. 1, a description thereof will be omitted.

In the above-described operation, when performing size reduction in the sub-scanning direction, printing is performed by skipping selection signal LSEL for one output line after printing every predetermined number of lines in place of sequentially outputting the signal in the case of printing lines with unit magnification. Thus, size reduction in the sub-scanning direction with a resolution of 15.4 lines/mm is realized.

Figure 5:
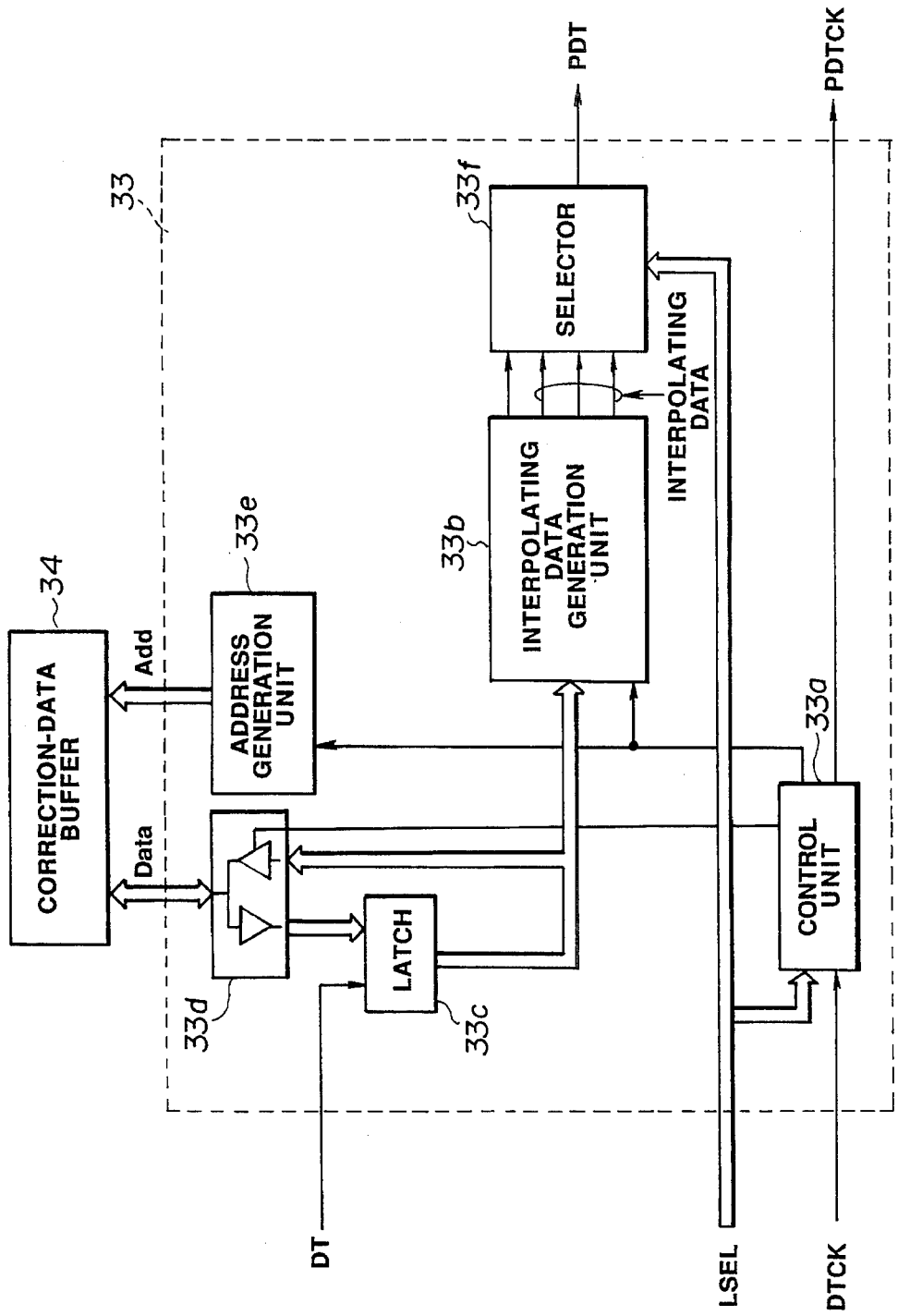
FIG. 5 is a block diagram showing the picture-quality correction unit 33 shown in FIG. 4.

FIG. 5 is a block diagram showing the circuitry of picture-quality correction unit 33 shown in FIG. 4. In FIG. 5, control unit 33a controls the operational timing for picture-quality correction unit 33. Interpolating data generation unit 33b contains matrices each comprising N pixels×M pixels of an original image, and generates data of three interpolating lines.

Interpolating data generation unit 33b executes smoothing processing by referring to image data of pixels surrounding a target pixel.

Latch 33c temporarily stores serially-input pixel data, and data of original pixels situated the same position in the main-scanning direction on a plurality of lines before the target pixel which have been read from correction-data buffer 34. Bidirectional buffer 33d inputs and outputs data to and from correction-data buffer 34. Address generation unit 33e generates access addresses for correction-data buffer 34. Selector 33f selects and outputs data of one print line from data of three interpolating lines and one original line in accordance with signal LSEL.

Figure 6:
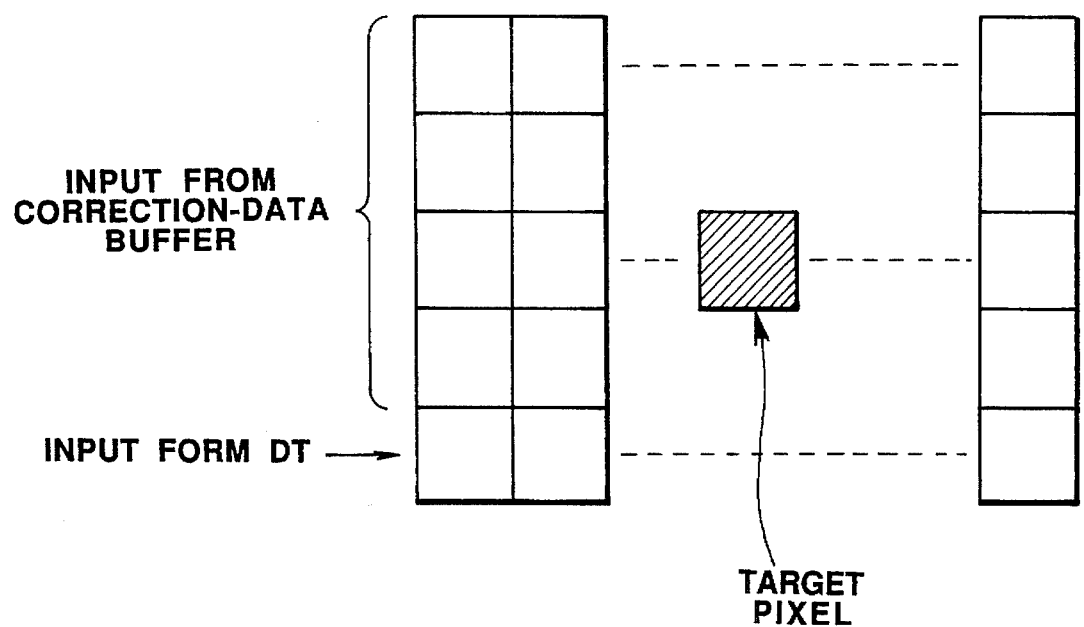
FIG. 6 is a diagram illustrating data within interpolating data generation unit 33b shown in FIG. 5.

Data of one pixel input as signal DT is input to interpolating data generation unit 33b via latch 33c, and to correction-data buffer 34 via bidirectional buffer 33d. When inputting data of one pixel as signal DT to interpolating data generation unit 33b, data already input to correction-data buffer 34 are read and input to interpolating data generation unit 33b. FIG. 6 indicates the status of data to be input to interpolating data generation unit 33b. Data of five pixels obtained by synthesizing the input as signal DT and the input from correction-data buffer 34 are sequentially input to interpolating data generation unit 33b. The hatched pixel shown in FIG. 6 represents the target pixel. Interpolating data generation unit 33b converts the data of the target pixel into three signals divided in the sub-scanning direction and subjected to smoothing processing based on the data of pixels surrounding the target pixel shown in FIG. 6. These output data comprise binary data indicating whether or not respective data are to be printed. Selector 33f selects one data from among three interpolating data and one original data in accordance with signal LSEL, and outputs the selected data as signal PDT.

Figure 7:
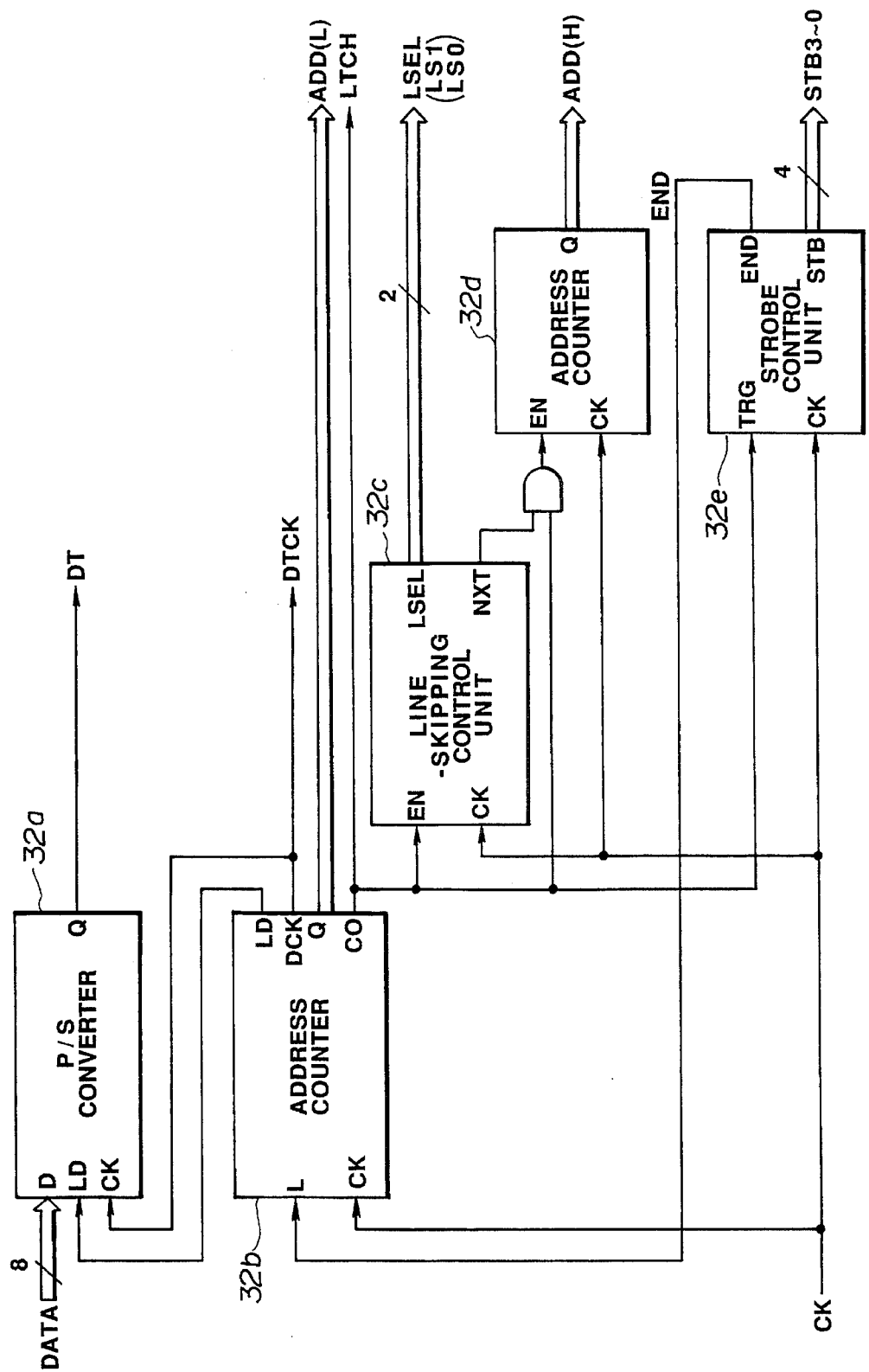
FIG. 7 is a diagram showing an example of circuitry of printing control unit 32 shown in FIG. 4.

FIG. 7 is a diagram illustrating the circuitry of printing control unit 32 shown in FIG. 4. In FIG. 7, parallel-serial converter 32a converts parallel print data into serial data. Address counter 32b generates data addresses to access a line buffer, and controls data clock signals and latch signals. Line-skipping control unit 32c generates selection signal LSEL (LSI and LSO) for selecting a print line by the above-described line selector 33f by counting latch signals LTCH. Address counter 32d generates an address for assigning a line when line buffer 31 is accessed after an original line and its interpolating lines have been printed. Strobe control unit 32e outputs strobe signals for driving the print head triggered by the output of latch signal LTCH, and outputs end signal END when the output of strobe signals for one line has been completed.

In the above-described configuration, line-skipping control unit 32c reloads an initial value every time a carry signal NXT has been output, and changes the initial value to be reloaded at every reloading operation when reducing the size of an original image. For example, the initial value is changed as C, C, C, D, . . . in the case of 3.85 lines/mm.

Figure 8:
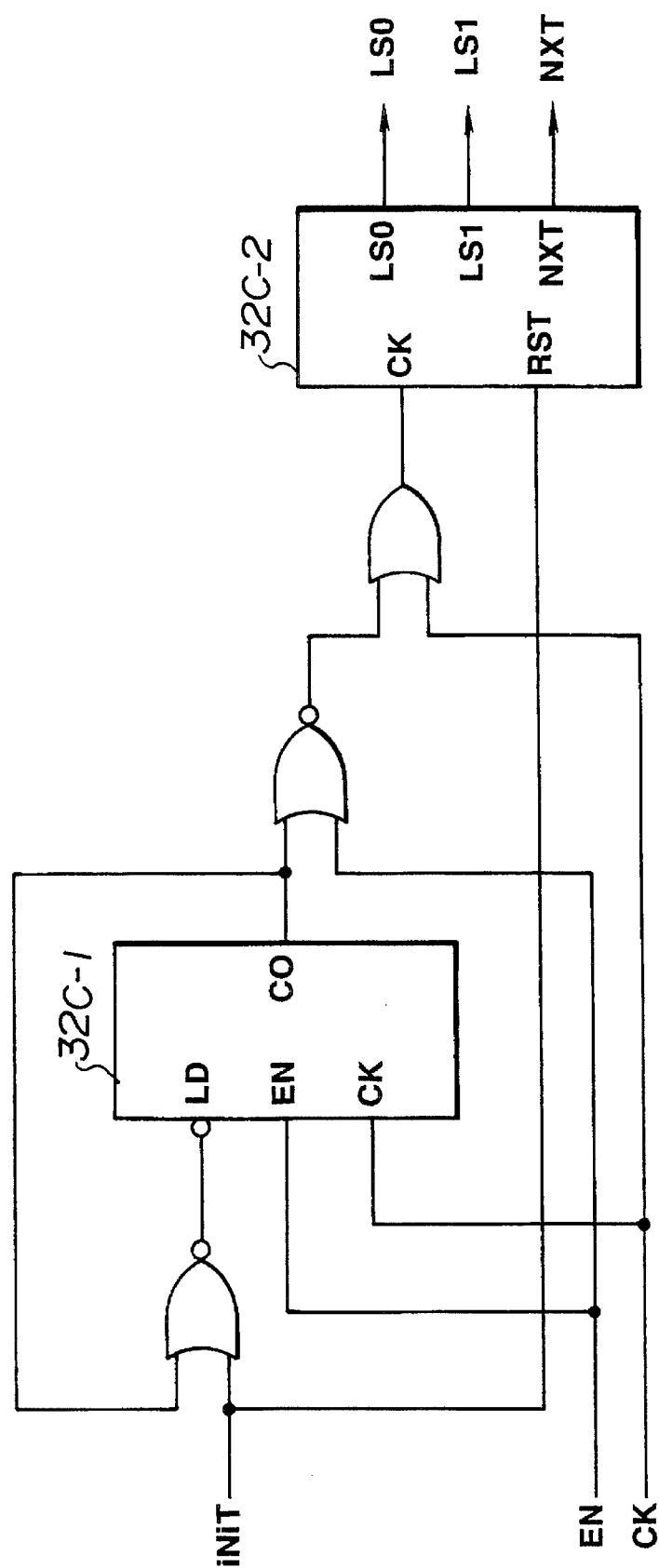
FIG. 8 is a diagram showing the detail of circuitry of line-skipping control unit 32c shown in FIG. 7.

FIG. 8 is a diagram illustrating line-skipping control unit 32c shown in FIG. 7 in further detail.

In FIG. 8, line-number counter 32C-1 determines lines to be skipped. Line selection counter 32C-2 selects a line to be output from among four lines, i.e., one original line and three interpolating lines. "INIT" represents an initializing signal for loading an initial value in the counter. "EN" represents a count-incrementing signal input once for every line. "CK" represents continuous clock pulses. "NXT" represents a pulse output for incrementing the value of line address counter 32d by one. "LS1" and "LS0" represent signals for selecting the output of an interpolating line.

An interpolating line is selected by a combination of signals "LS1" and "LS0". For example, when converting data with 3.85 lines/mm into data with 15.4 lines/mm, lines are selected in the following manner:

| LS1 | LS0 | |
|---|---|---|
| 0 | 0 | :the original line |
| 0 | 1 | :the first interpolating line |
| 1 | 0 | :the second interpolating line |
| 1 | 1 | :the third interpolating line. |

Figure 9:
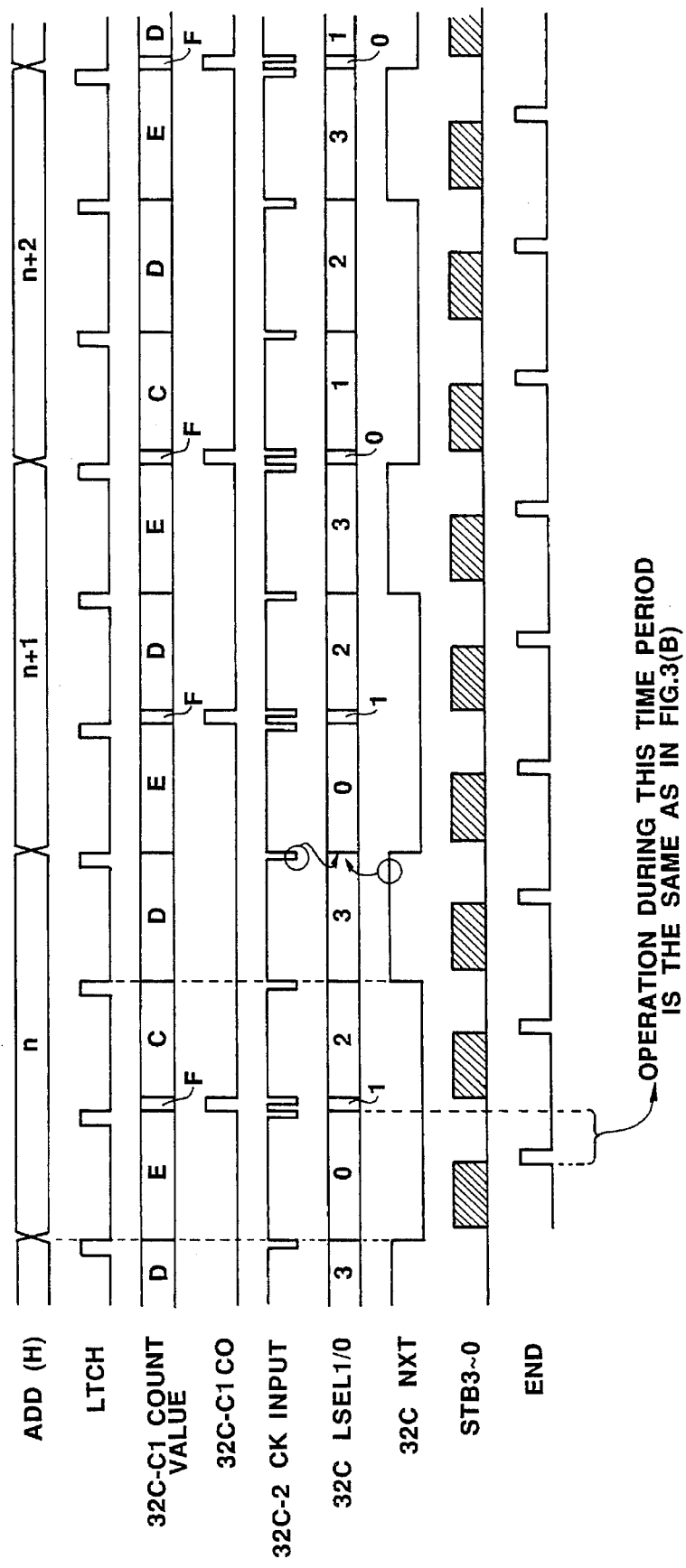
FIG. 9 is a timing chart for the circuitry shown in FIGS. 7 and 8.

FIG. 9 illustrates a timing chart for the circuitry shown in FIGS. 7 and 8. In the case shown in FIG. 9, printing is performed by skipping (omitting) the first interpolating line of the n-th line and the (n+1)-th line of original data, and the (n+2)-th line of original data.

Figure 10:
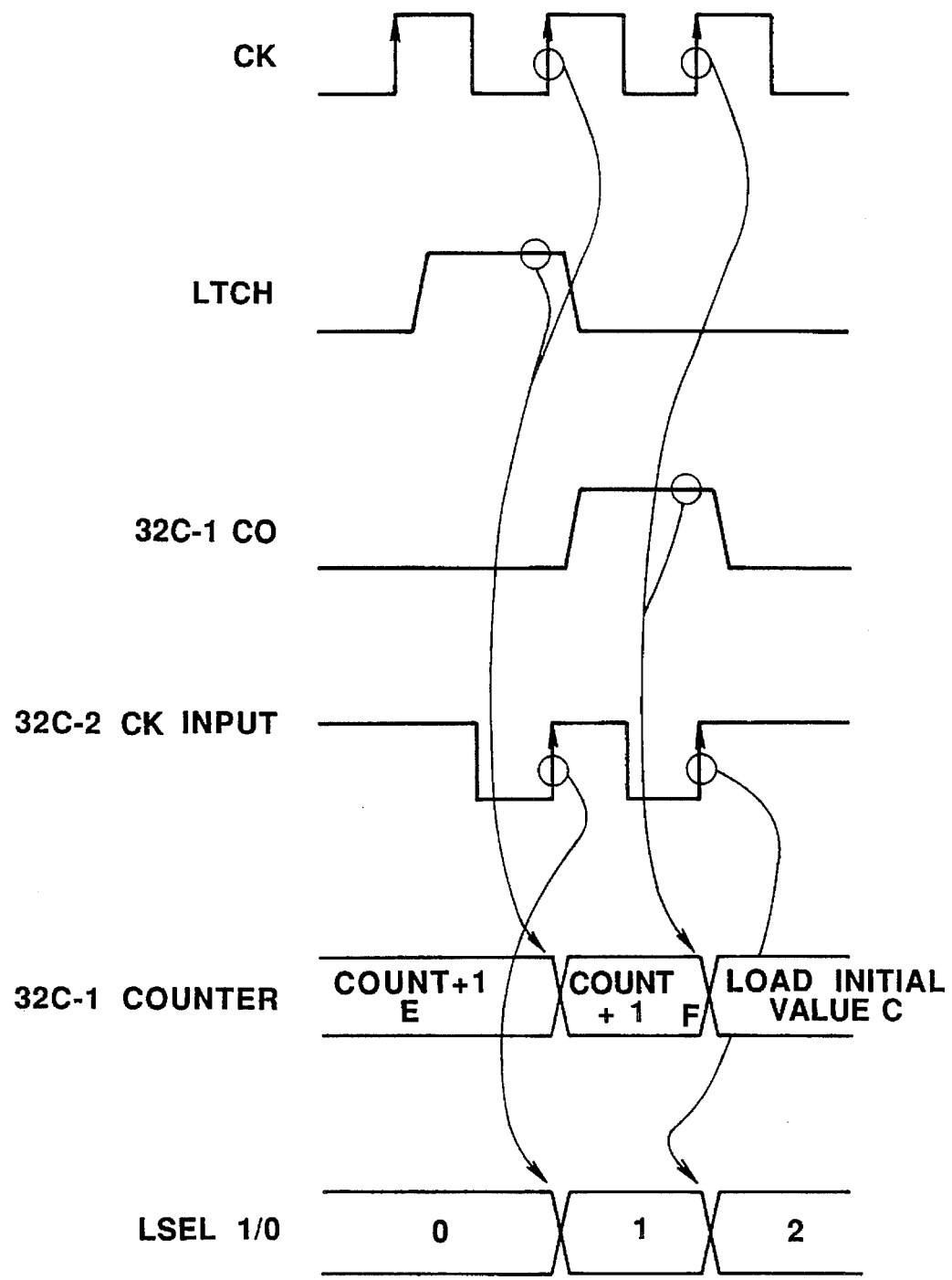
FIG. 10 is an enlarged diagram of a part of the timing chart shown in FIG. 9.

FIG. 10 is an enlarged diagram of a part of FIG. 9, and illustrates the manner of skipping the first interpolating line.

Figure 13:
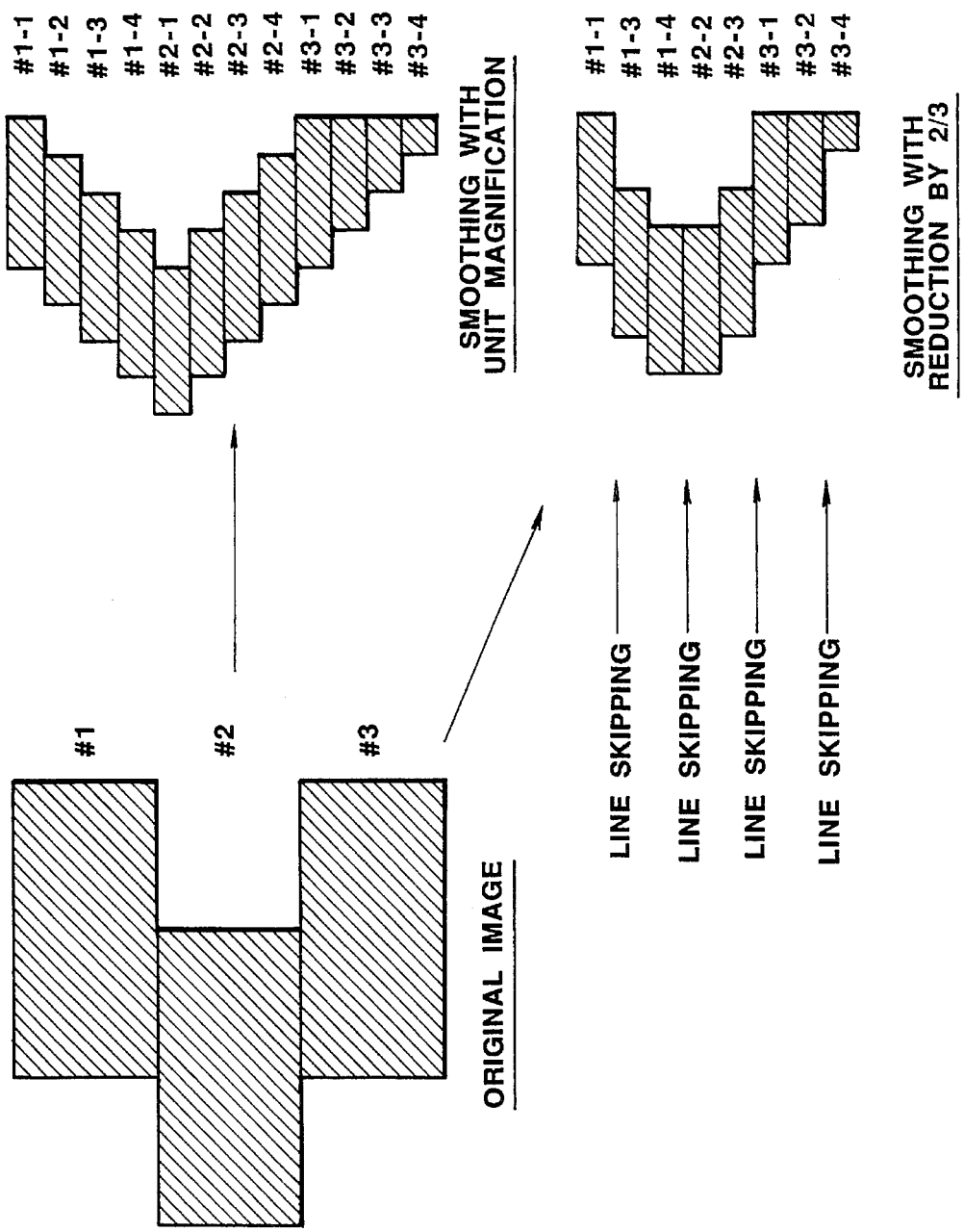
FIG. 13 is a diagram illustrating a printed image obtained by performing size reduction by $2/3$ in the second embodiment.

FIG. 13 illustrates an example of printing when the size of an original image is reduced by ⅔ in a second embodiment of the present invention.

In a printing operation with unit magnification, each of three original lines shown at the left of FIG. 13 becomes four lines subjected to smoothing processing. For example, line #1 becomes lines #1-1, #1-2, #1-3 and #1-4.

For print lines subjeted to the above-described smoothing processing, an image obtained by reducing the size of an original image by ⅔ using the sub-scanning reduction method of the present embodiment is illustrated at the lower right of FIG. 13.

In this embodiment, since lines after being subjected to smoothing processing are skipped for every three lines, lines #1-2, #2-1, #2-4 and #3-3 are skipped.

In the above-described embodiment of skipping interpolating lines, when the original image has a resolution of 3.85 lines/mm and the printing unit has a resolution of 15.4 lines/mm in the sub-scanning direction, three interpolating lines are always provided between adjacent original lines irrespective of the presence of lines to be skipped. Alternatively, smoothing processing may be performed with two interpolating lines if lines to be skipped are present. Thus, influence by a skipping operation can be reduced.

As exceptional processing, if lines to be skipped correspond to original lines, lines to be skipped may be changed to interpolating lines next to the respective original lines. Thus, the loss of information of an original image can be prevented. Such processing has the effect of reducing deterioration in picture quality caused by the size reduction when the image to be printed is expressed with pseudo-halftone.

The present invention may be applied to a system comprising a plurality of apparatuses, or an apparatus comprising a single unit. The present invention may, of course, be applied to a case in which the invention is achieved by supplying a system or an apparatus with programs.

Although in the above-described embodiments a description has been provided illustrating a printing unit of a facsimile apparatus, the present invention is not limited to such a case, but may be applied to image output apparatuses having a function of printing an image obtained by reducing or magnifying an original image, in addition to fascimile apparatuses.

As described above, according to the present invention, it is possible to provide an image subjected to smoothing processing without loosing any lines in an original image.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming apparatus, comprising:

input means for inputting lines of image data;

formation means for forming second image data, of a plurality of lines, each equal in amount to data input via said input means, for each line input via said input means;

selection means for selecting image data of a predetermined number of lines from among the image data of the plurality of lines formed by said formation means; and output means for outputting an image based on the image data of the predetermined number of lines selected by said selection means.

2. An image forming apparatus according to claim 1, wherein said input means receives and inputs image data transmitted from a network.

3. An image forming apparatus according to claim 1, wherein said input means inputs the lines of image data with a first density, and wherein said output means outputs the image with a second density higher than the first density.

4. An image forming apparatus according to claim 1, wherein said formation means comprises a memory for storing image data of a plurality of lines input by said input means, and wherein the image data of the plurality of lines from the standard image data of one line is formed according to the image data of the plurality of lines stored in said memory.

5. An image forming apparatus according to claim 4, wherein said formation means forms the image data of the plurality of lines subjected to smoothing processing from the stored image data of one line according to the image data of the plurality of lines stored in said memory.

6. An image forming apparatus according to claim 1, wherein said selection means changes the number of the selected lines in accordance with a reduction ratio of a size of the image.

7. An image forming method, comprising the steps of:

inputting lines of image data;

forming second image data, equal in amount to data of a plurality of lines, for each line input in said inputting step;

selecting image data of a predetermined number of lines from among the image data of the plurality of lines formed in said forming step; and outputting an image based on the image data of the predetermined number of lines selected in said selecting step.

8. An image forming method according to claim 7, wherein said inputting step receives and inputs image data transmitted from a network.

9. An image forming method according to claim 7, wherein said inputting step inputs the image data with a first density, and wherein said outputting step outputs the image with a second density higher than the first density.

10. An image forming method according to claim 7, wherein said forming step includes storing image data of a plurality of lines input by said inputting step in a memory, and forming the image data of the plurality of lines from the image data of one line in accordance with the image data of the plurality of lines stored in the memory.

11. An image forming method according to claim 7, wherein said forming step inlcudes storing image data of a plurality of lines input by said inputting step in a memory, forming the image data of the plurality of lines subjected to smoothing processing from the image data of one line in accordance with the image data of the plurality of lines stored in the memory.

12. An image forming method according to claim 7, wherein said selecting step changes the number of the selected lines in accordance with a reduction ratio of a size of the image.

13. An image forming apparatus for correcting original image data having a resolution i in a sub-scanning direction into image data having a resolution j (j≈n·i) in the sub-scanning direction, said apparatus comprising:

input means for inputting original image data having the resolution i in the sub-scanning direction of at least one line;

formation means for forming (n−1) interpolating image data for each line of the original image data input by said input means;

selection means for selecting k (k≦n) image data corresponding to a reduction ratio from among the (n−1) interpolating image data and original image data of one line input by said input means; and output means for outputting the image data selected by said selection means with the resolution j in the sub-scanning direction as correction data.

14. An image forming apparatus, comprising:

input means for inputting first image data;

storing means for storing the first image data input by said input means;

formation means for forming smoothing-processed second image data which is greater in amount than the first data, from first image data stored in said storing means;

selection means for selecting predetermined image data in accordance with a reduction ratio of image size from among the second image data; and output means for outputting an image based on the image data selected by said selection means.

15. An image forming method comprising the steps of:

inputting first image data;

storing the first image data input in said inputting step;

forming smoothing-processed second image data which is greater in amount than the first data, from first image data stored in said storing step;

selecting predetermined image data in accordance with a reduction ratio of image size from among the second image data; and outputting an image based on the image data selected in said selecting step.

16. An image forming apparatus, comprising:

input means for inputting first image data;

formation means for forming second image data which is greater in amount than the first data, from first image data input by said input means;

selection means for selecting predetermined image data in accordance with a reduction ratio of image size from among the second image data;

output means for outputting an image based on the image data selected by said selection means, and smoothing process means which carries out smoothing process in order that the image output from said output means is smoother than the input image.

17. An image forming method comprising the steps of:

inputting first image data;

forming second image data which is greater in amount than the first image data, from first image data input by said input step;

selecting predetermined image data in accordance with a reduction ratio of image size from among the second image data; and outputting an image based on the image data selected in said selecting step, and carrying out smoothing process in order that the image output at said output step is smoother than the input image.

* * * * *